(12) United States Patent
Xu et al.

(10) Patent No.: US 11,463,237 B2
(45) Date of Patent: Oct. 4, 2022

(54) METHOD AND SYSTEM FOR ROBUST, SEARCHABLE, SYMMETRICAL ENCRYPTION

(71) Applicant: HUAZHONG UNIVERSITY OF SCIENCE AND TECHNOLOGY, Wuhan (CN)

(72) Inventors: Peng Xu, Wuhan (CN); Tianyang Chen, Wuhan (CN); Yubo Zheng, Wuhan (CN); Hai Jin, Wuhan (CN); Wei Wang, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 80 days.

(21) Appl. No.: 17/172,145

(22) Filed: Feb. 10, 2021

(65) Prior Publication Data

US 2022/0103340 A1    Mar. 31, 2022

(30) Foreign Application Priority Data

Sep. 30, 2020  (CN) .......................... 202011069480.9

(51) Int. Cl.
*H04L 29/06* (2006.01)
*H04L 9/06* (2006.01)
(Continued)

(52) U.S. Cl.
CPC ...... *H04L 9/0637* (2013.01); *G06F 16/24552* (2019.01); *H04L 9/0861* (2013.01); *H04L 9/0891* (2013.01)

(58) Field of Classification Search
None
See application file for complete search history.

(56) References Cited

U.S. PATENT DOCUMENTS

2010/0250497 A1 * 9/2010 Redlich ................. H04L 63/105
707/661

FOREIGN PATENT DOCUMENTS

CN    108449309 A  *  8/2018   ........... H04L 63/045

* cited by examiner

*Primary Examiner* — Andrew J Steinle
(74) *Attorney, Agent, or Firm* — Michael X. Ye; Rimon, PC (57) ABSTRACT

The present invention relates to a method and a system for robust, searchable, symmetrical encryption, the method comprising: during initialization, having a retrieval server perform retrieval on stored ciphertext information according to a searchable ciphertext and retrieval trapdoor information ($Cnt_{upd}$, K, $Loc_{grp}$) sent by a client, wherein, the retrieval server acquires a last received first ciphertext set $C_{new}$ from a ciphertext database CDB just before the present retrieval according to a retrieval key K and an encryption counter $Cnt_{upd}$ sent by the client, acquiring a second ciphertext set $C_{cache}$ in a retrieval request history from a cache ciphertext database GRP according to a cache ciphertext index $Loc_{grp}$, and merging the first ciphertext set $C_{new}$ and the second ciphertext set $C_{cache}$ to form a retrieval set $\mathcal{J}$, and sending it to the client for decryption. The present invention is able to improve retrieval performance of searchable symmetrical encryption algorithm with robust forward and backward secrecy and to make searchable symmetrical encryption algorithm more practical.

20 Claims, 2 Drawing Sheets

(51) Int. Cl.
*G06F 16/2455* (2019.01)
*H04L 9/08* (2006.01)

METHOD AND SYSTEM FOR ROBUST, SEARCHABLE, SYMMETRICAL ENCRYPTION

CROSS-REFERENCE TO RELATED APPLICATIONS

This application claims the benefit of the Chinese Patent Application No. CN202011069480.9 filed on Sep. 30, 2020, which is hereby incorporated by reference as if fully set forth herein.

BACKGROUND

1. Technical Field

The present invention relates to the field of cloud storage secrecy technology, and more particularly to a method and a system for robust, searchable, symmetrical encryption.

2. Description of Related Art

As the development of the cloud-based computation industry, outsourcing data storage has become a popular practice. Compared to traditional local file storage, outsourced data stored has two major advantages. Firstly, it provides secrecy. Users are free from worry about data loss when losing or breaking their local storage devices. The cloud service providers usually have proven technical competence in securing stored data. Secondly, it provides convenience. Users are free from trouble about carrying storage devices as they go out. When they need to access their files, they can send a request to the could server through the internet anytime, anywhere. When using outsourced storage services, for ensuring data secrecy, users have to encrypt their data before the data is sent to a cloud server. However, the encrypted data is adverse to users' need of data retrieval, making the data less usable.

To address this problem, searchable symmetrical encryption as a solution has been introduced. The searchable symmetrical encryption technology enables users to retrieve keywords in encryption data safely, and thus has received extensive attention. After years of development, with introduction of forward secrecy and backward, searchable symmetrical encryption has experienced a leap in security. However, most of the existing solutions for searchable symmetrical encryption lack for an important quality, namely robustness. Robustness refers to the ability of a searchable encryption system to uphold its asserted secrecy and remain normal functionality even if users perform unreasonable updating operations. As used herein, the "unreasonable updating operations" include repeated addition and deletion of non-existent data. In practical applications, robustness is an essential quality because no solutions can completely prevent users from making false requests in use. In addition, the existing solutions for searchable symmetrical encryption with robust forward and backward secrecy have relatively poor retrieval parallelism and relatively low retrieval-algorithm running efficiency. Hence, in order to make searchable symmetrical encryption algorithm more practical, there is a need for an improved solution for searchable symmetrical encryption that is parallel and robust with forward and backward secrecy.

China Patent Publication No. CN110765469A disclosed an efficient and robust dynamic searchable symmetric encryption method and system, which belong to the field of cloud storage secrecy and comprise the following steps: for any keyword w, obtaining key information used by the latest operation associated with the keyword w and a corresponding ciphertext index L' and a trapdoor T' at a retrieval client to generate a ciphertext of the current operation, and sending the ciphertext to a retrieval server so as to store the ciphertext in a ciphertext database; the ciphertext meta-information of the generated ciphertext comprises L' and T'; the ciphertext meta-information of the deletion operation ciphertext also comprises a deletion credential; updating key information when a retrieval ciphertext is generated, wherein the ciphertext meta information also comprises an update evidence between keys used by the previous retrieval operation and the current retrieval operation, and the retrieval ciphertext is transmitted and L' and T' are transmitted simultaneously; and at the retrieval server, obtaining all the ciphertexts associated with the keyword w and sending the result set to the retrieval client after the ciphertexts needing to be deleted are deleted. While the known approach improves robustness of the searchable symmetrical encryption method, it involves storing the ciphertext in a hidden link table and this significantly limits its performance because ciphertext retrieval of a certain keyword is limited to single-threading retrieval performed along a single link table. Moreover, since the known approach implements a special structure where the meta-information is deleted from the ciphertext, the physical deletion requires complicated algebraic operations, which degrade the overall execution efficiency.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY

The conventional methods for robust dynamic searchable symmetrical encryption have the following defects:

(1) For ensuring the correctness of data deletion, searchable ciphertexts are identified using key-update pseudo-random functions. However, the key-update pseudo-random function when being used for a certain ciphertext, may require costly algebraic operations, and this seriously degrade ciphertext retrieval efficiency. Moreover, due to the linked structure between ciphertexts, only single-threading retrieval is possible, and using multiple processors to increase the speed is not feasible; and (2) Since there is a single database, the ciphertext database EDB, storing the searchable ciphertexts, the ciphertexts that have been retrieved may be repeatedly retrieved, degrading the overall retrieval efficiency.

In view of the shortcomings of the prior art, the present invention provides a method for robust, searchable, symmetrical encryption, the method at least comprising:

during initialization, having a retrieval server perform retrieval on stored ciphertext information according to a searchable ciphertext and retrieval trapdoor information $(Cnt_{upd}, K, Loc_{grp})$ sent by a client, wherein, the retrieval server acquires a last received first ciphertext set $C_{new}$ from a ciphertext database CDB just before the present retrieval according to a retrieval key K and an encryption counter $Cnt_{upd}$ sent by the client, acquiring a second ciphertext set $C_{cache}$ in a retrieval request history from a cache ciphertext database GRP according to a cache ciphertext index $Loc_{grp}$, and merging the first ciphertext set $C_{new}$ and the second ciphertext set $C_{cache}$ to form a retrieval set $\mathcal{J}$, and sending it to the client for decryption.

The present invention implements a ciphertext database CDB and a cache ciphertext database GRP to store searchable ciphertexts. The ciphertext database CDB only stores ciphertexts that are lately uploaded and have not been retrieved. The cache ciphertext database GRP store ciphertexts that have been retrieved. The ciphertext stored in the ciphertext database CDB, after being retrieved, are stored into the cache ciphertext database GRP. With such a dual database structure, the present invention allows the retrieval server to use $Loc_{grp}$ to directly acquire the historical ciphertexts that have experienced a retrieval form the cache ciphertext database GRP directly, thereby skipping retrieval computation and preventing repeated retrievals for the same ciphertext, leading to improved retrieval efficiency.

Preferably, the generation method of the searchable ciphertext at least comprises:

acquiring a retrieval counter $Cnt_{srch}$ and the encryption counter $Cnt_{upd}$ related to a keyword w from a keyword counter log Count, computing the retrieval key K and a ciphertext unique identification key K' based on the retrieval counter $Cnt_{srch}$, computing a ciphertext index L and a ciphertext metadata D based on the encryption counter $Cnt_{upd}$, the retrieval key K, and the ciphertext unique identification key K', and sending (L, D, C) as the searchable ciphertext to the retrieval server, wherein a file identifier ciphertext $C \leftarrow SE.Enc(K_{SE}, id)$.

Additionally, the present invention uses the unique identification key to eliminate algebraic operations during retrieval, thereby effectively improving efficiency of ciphertext retrievals.

Preferably, the computation of the retrieval key K is realized by:

$K \leftarrow F(S, w \| Cnt_{srch})$, wherein $\|$ represents a concatenation operation for bit strings, S represents a main generation key, w represents the keyword, and $Cnt_{srch}$ represents the retrieval counter.

Preferably, the computation of the ciphertext unique identification key K' is realized by:

$K' \leftarrow F(S, w \| IC)$, wherein S represents a main generation key, w represents the keyword, $\|$ represents a concatenation operation for bit strings, and IC is any fixed constant value that can never be obtained by the retrieval counter $Cnt_{srch}$.

Preferably, the computation of the ciphertext index L and the ciphertext metadata D is realized by:

$L \| D \leftarrow H(K, Cnt_{upd}) \oplus (0^{\lambda'} \| op \| G(K', w \| id))$, wherein, K represents the retrieval key, $Cnt_{upd}$ represents the encryption counter, $\oplus$ is a bit XOR operation; $0^{\lambda'}$ represents an all 0 bit string having a length of $\lambda'$; $op \in \{add, del\}$, represents an operator of the present encryption, for differentiating an addition operation from a deletion operation, with a binary length of x, $x \geq 1$; K' represents the ciphertext unique identification key, w represents the keyword, id represents the file identifier, the ciphertext index L represents the first $\lambda'$ bits of a result of the XOR operation; the ciphertext metadata D represents the last $\lambda+x$ bits of the result of the XOR operation.

Preferably, the generation of the searchable ciphertext further comprises:

after computation of the ciphertext index L, the ciphertext metadata D and the file identifier ciphertext C is done, updating the keyword counter log $Count[w] \leftarrow (Cnt_{upd}, Cnt_{srch})$, wherein $Cnt_{srch}$ represents the retrieval counter, and $Cnt_{upd}$ represents the encryption counter.

Preferably, the encryption basic information comprises one or more of an identifier encryption/decryption key $K_{SE}$, the main generation key S and the keyword counter log Count, the to-be-encrypted keyword w, a keyword-corresponding operation op and a keyword-associated file identifier id, the generated ciphertext index L, the generated ciphertext metadata D, and the generated file identifier ciphertext C.

The present invention further relates to a system for robust, searchable, symmetrical encryption, the system at least comprising: a client and a retrieval server, the client and the retrieval server being in wired or wireless data connection, during initialization, the retrieval server performs retrieval on stored ciphertext information according to a searchable ciphertext and retrieval trapdoor information ($Cnt_{upd}$, K, $Loc_{grp}$) sent by the client, wherein the retrieval server acquires a last received first ciphertext set $\mathcal{T}$ from a ciphertext database CDB just before the present retrieval according to a retrieval key K and an encryption counter $Cnt_{upd}$ sent by the client, and where there is tuple $(X_\mathcal{D}, \mathcal{D}) \in i_\mathcal{D}$, and $X_\mathcal{T} = X_\mathcal{D}, i_\mathcal{T} < i_\mathcal{D}$ is true, $(X_\mathcal{T}, C_\mathcal{T}, i_\mathcal{T})$ is deleted from $\mathcal{T}$, and the first ciphertext set $\mathcal{T}$ after the deletion is denoted by $C_{new}$, wherein $\mathcal{D}$ represents a set comprising at least one tuple that includes meta-information $X_\mathcal{D}$ and a counter $i_\mathcal{D}$, and acquiring a cache ciphertext set GRP [$Loc_{grp}$] associated with the keyword w from a cache ciphertext database GRP according to a cache ciphertext index $Loc_{grp}$, deleting any (X', C')tuple that satisfies $X' \in \{X_\mathcal{D} | (X_\mathcal{D}, i) \in \mathcal{D}\}$ from the cache ciphertext set GRP [$Loc_{grp}$], and denoting the GRP [$Loc_{grp}$] after the deletion as a second ciphertext set $C_{cache}$, and merging file identifier ciphertexts in both of the first ciphertext set $C_{new}$ and the second ciphertext set $C_{cache}$ to form the retrieval set $\mathcal{J}$ sent to the client for decryption.

In the present invention, the searchable ciphertext is generated using the counter, and this allows segment-wise computation of the value of the counter during retrieval, thereby realizing multithreading, parallel retrieval.

Preferably, the client generates the retrieval trapdoor information by: based on a log $(Cnt_{upd}, Cnt_{srch}) \leftarrow Count[w]$ that is associated to the keyword w and is acquired from the keyword counter log Count, where $(Cnt_{upd}, Cnt_{srch}) \neq (NULL, NULL)$, computing the retrieval key $K \leftarrow F(S, w \| Cnt_{srch})$, a ciphertext unique identification key $K' \leftarrow F(S, w \| IC)$ and a cache ciphertext index $Loc_{grp} \leftarrow G(K', w)$, respectively, sending ($Cnt_{upd}$, K, $Loc_{grp}$) as the retrieval trapdoor information to the retrieval server, wherein, $Cnt_{srch}$ represents a retrieval counter.

Preferably, the client decrypts the retrieval set $\mathcal{J}$ by:

if $\mathcal{J}$ is an empty set, ending the operation; or if there are n elements $\{C_1, C_2, \ldots C_n\}$ in $\mathcal{J}$, for each said element $C_i$, $1 \leq i \leq n$ in the $\mathcal{J}$, performing $id_i \leftarrow SE.Dec(K_{SE}, C_i)$, and outputting a file identifier result set $\{id_1, id_2, \ldots id_n\}$.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

In view of the shortcomings of the prior art, the present invention provides a method and a system for robust, searchable, symmetrical encryption. The objective of the present invention is to improve retrieval performance of searchable symmetrical encryption algorithm with robust forward and backward secrecy.

Figure 2:
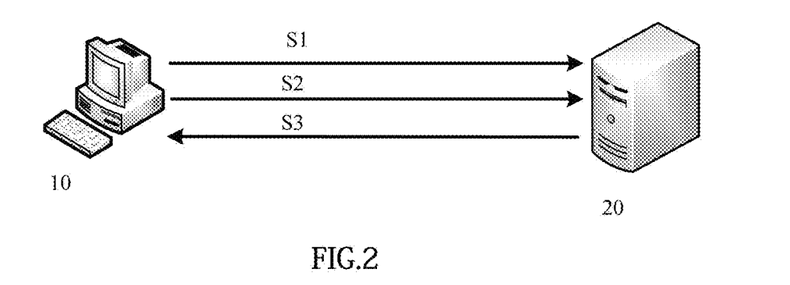
FIG. 2 is a structural diagram of the operation of the present invention.

As shown in FIG. 2, the present invention at least comprises a client 10 and a retrieval server 20. However, the numbers of both the client 10 and the retrieval server 20 are not limited to one, each of which may be more than one.

The client 10 and the retrieval server 20 are in wired or wireless communication. The client is a mobile or immovable computer, a phone terminal, a tablet terminal, or the like. The retrieval server 20 includes one or more of an application-specific integrated chip, a server, a server farm, and a cloud server.

The client 10 at least comprises: a key-generating module 11, an encryption module 13, and a trapdoor-generating module 15. The key-generating module 11 is an application-specific integrated chip, a processor or a server capable of executing a key-generating process. The encryption module 13 is an application-specific integrated chip, a processor or a server capable of executing an encryption process. The trapdoor-generating module 15 is an application-specific integrated chip, a processor or a server capable of executing a trapdoor-generating process. Preferably, the key-generating module 11, the encryption module 13, and the trapdoor-generating module 15 may be integrated into two or even a single unitized application-specific integrated chip, processor or server. The key-generating module 11, the encryption module 13 and the trapdoor-generating module 15 are in data connection with each other, while the key-generating module 11, the encryption module 13 and the trapdoor-generating module 15 are in data connection with at least one communication module, respectively.

The retrieval server 20 at least comprises a database 12 and a retrieval module 14. The database 12 is a hard drive, an application-specific integrated chip, a server or a processor capable of storing data. The retrieval module 14 is an application-specific integrated chip, a processor or a server capable of performing retrievals. The database 12 and the retrieval module 14 may be integrated into a unitized application-specific integrated chip, processor or server. The database 12 and the retrieval module 14 are in data connection, and the database 12 and the retrieval module 14 are in data connection with at least one communication module, respectively.

Therein, the key-generating module 11 is used to perform system initialization locally and generate symmetric keys. Preferably, the key-generating module 11 is configured to initialize a database 12 on the retrieval server. The encryption module 13 is used to encrypt specified keyword-file identifier pairs and operation types according to a symmetric key and a local state sent by the key-generating module 11, and to transmit searchable encryption ciphertexts to the database 12 of the retrieval server. The database 12 stores and saves the received searchable ciphertexts. The trapdoor-generating module 15 generates ciphertext indexes, retrieval trapdoors corresponding to the ciphertext indexes, and retrieval ciphertexts according to the symmetric key and the local state sent by the key-generating module 11, and transmits these to the retrieval server as retrieval request information. The retrieval module 14, according to a received retrieval request, performs retrieval or deletion on the database 12, and returns the ciphertexts as retrieval results. The decryption module 17, according to the retrieval results fed back by the retrieval server, decrypts the retrieval results and acquires file identifiers contained therein, so as to update the local state accordingly.

The present invention may be alternatively embodied as a system for robust, searchable, symmetrical encryption, which comprises a processor and a computer-readable storage medium. The computer-readable storage medium is used to store executable programs. The processor is used to read executable programs from the computer-readable storage medium, and execute the disclosed method for robust, searchable, symmetrical encryption.

In the present invention, during initialization, secrecy parameters $\lambda$ and $\lambda'$ have to be predefined according to application needs, and encryption/decryption algorithms corresponding to the secrecy parameters have to be determined. Therein, $\lambda$ is a non-zero natural number. The larger its value is, the searchable symmetrical encryption method is more secure yet the corresponding computation is more complicated. $\lambda'=\text{poly}(\lambda)$, meaning that $\lambda'$ is a value related to the $\lambda$ polynomial. During initialization, the secrecy parameter $\lambda$ is used to determine the key in the algorithm and binary lengths of the input and the output of the partial correlation function. With this value being greater, the present invention is more secure. Herein, $\lambda$ may be 256, and $\lambda'$ may be 248.

In the present invention, during initialization, a pseudo-random function, a cryptographic Hash function, and cryptographic Hash function are established and keys are generated.

The pseudo-random function $F: K_F \times X_F \rightarrow Y_F$, where $K_F$ is the key space of F, $K_F=\{0,1\}^\lambda$, $X_F$ is the input space of F, $X_F=\{0,1\}^*$, $Y_F$ is the output space of F, $Y_F=\{0,1\}^\lambda$. $\{0,1\}^\lambda$ represents a bit string whose binary length is $\lambda$. $\{0,1\}^*$ represents a bit string whose binary length is arbitrary. The pseudo-random function F may be of a HMAC algorithm structure.

The cryptographic Hash function $H: \{0,1\}^* \rightarrow \{0,1\}^{\lambda'+\lambda+x}$, whose input is a bit string whose binary length is arbitrary, and whose output is a bit string whose binary length is $\lambda'+\lambda+x$. x represents the binary length of an operator. The operator is used to indicate the operation type. In the present invention, two operations are supported, namely the addition operation (add) and the deletion operation (del), $x \geq 1$. For facilitating computation, it is set that $x=1$. Correspondingly, the binary length of the output of the cryptographic Hash function H is $\lambda'+\lambda+1$. The cryptographic Hash function H may be of a SHA512 algorithm structure.

The cryptographic Hash function $G: \{0,1\}^* \rightarrow \{0,1\}^\lambda$, whose input is a bit string whose binary length is arbitrary, and whose output is a bit string whose binary length is $\lambda$. The cryptographic Hash function G may be of a SHA256 function structure.

In the present invention, the encryption file identifier id of the symmetrical encryption algorithm SE has two algorithms, SE.Enc and SE.Dec.

a) C←SE.Enc(K, P): inputting the key K and the plaintext P, and the ciphertext C is output probabilistically. Therein, the term "probabilistically" means given that the key K and the plaintext P remain unchanged, when SE.Enc(K, P) are executed repeatedly, the output ciphertexts C are different.

b) P←SE.Dec(K, C): inputting the key K and the ciphertext C, if C=SE.Enc(K, P), the output plaintext is K, or a null value is output.

In practical applications, SE is typically such selected that it is of the Advanced Encryption Standard (AES) series algorithm structure.

Preferably, the client further comprises at least one storage module, used to secretly store the identifier encryption/decryption key $K_{SE}$, the main generation key S and the keyword counter log Count. Preferably, the storage module is externally non-accessible. The keyword counter log Count is used to record the encryption counter $Cnt_{upd}$ and the retrieval counter $Cnt_{srch}$ of the specified keyword w. It is denoted by Count[w]=($Cnt_{upd}$, $Cnt_{srch}$), where the encryption counter $Cnt_{upd}$ and the retrieval counter $Cnt_{srch}$ are each an integer greater than or equal to 0. If the keyword w is not recorded in the Count, then Count[w]=(NULL, NULL).

In the present invention, the identifier encryption/decryption key $K_{SE}$ and the main generation key S are each a bit string having a length of λ.

The database 12 of the present invention comprises a ciphertext database CDB and a cache ciphertext database GRP. The ciphertext database CDB is used to store ciphertexts according to a ciphertext index. The cache ciphertext database GRP is used to cache previous retrieval results, such as the second ciphertext set $C_{cache}$ in the cache retrieval request history. The present invention implements the ciphertext database CDB and the cache ciphertext database GRP to store searchable ciphertexts. Therein, the ciphertext database CDB only stores ciphertexts that are newly uploaded and have not been retrieved. The cache ciphertext database GRP stores ciphertexts that have been retrieved. The ciphertexts stored in the ciphertext database CDB after being retrieved will be stored into the cache ciphertext database GRP. By using the dual database structure, the present invention allows the retrieval server to directly acquire historical ciphertexts that have been retrieved from the cache ciphertext database GRP using $Loc_{grp}$, thereby skipping retrieval computation and preventing repeated retrievals for the same ciphertext, leading to improved retrieval efficiency.

Preferably, the keyword counter log Count is realized using a sqlite database.

The ciphertext database CDB is realized using a MySQL database system. The cache ciphertext database GRP is realized using a MySQL database system or a MongoDB database system.

Figure 1:
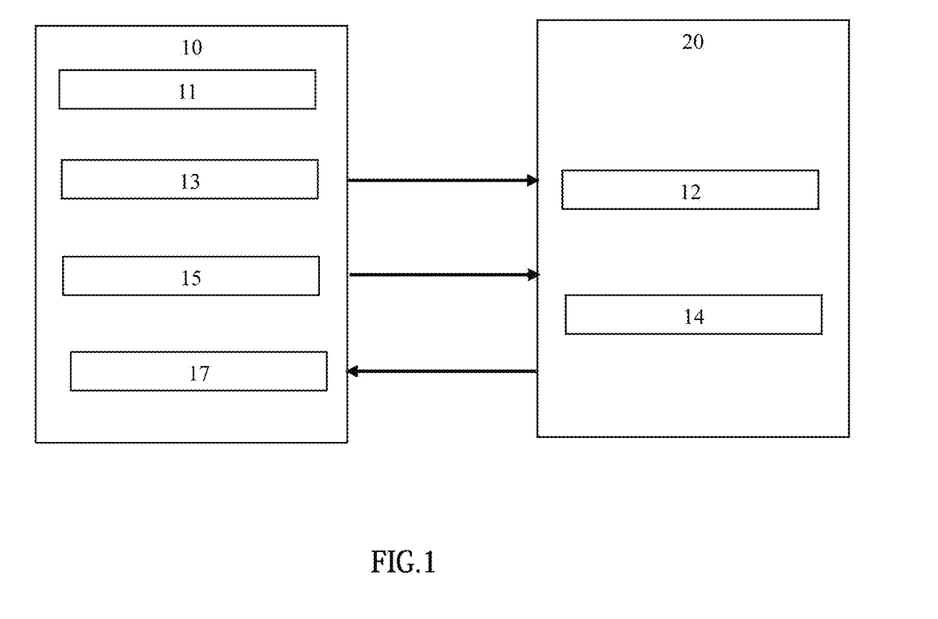
FIG. 1 is a logic module diagram of a system of the present invention.

The system for robust, searchable, symmetrical encryption of the present invention, as shown in FIG. 1, executes the following steps.

At S11, the key-generating module 11 initializes the system parameters, and generates key parameters according to secrecy parameters λ and λ' for secret storage.

At S12, the key-generating module 11 sends an instruction to retrieval server 20 for initialization of the database 12, and initialization of the database 12 is performed according to the initialization instruction.

At S13, the encryption module encrypts the keyword and the file identifier according to the input encryption basic information, and generates a searchable ciphertext that is then transmitted to the retrieval server 20.

At S14, the database 12 receives the searchable ciphertext and stores it.

At S15, the trapdoor-generating module 15 generates a retrieval ciphertext, according to the input encryption basic information, and creates corresponding retrieval trapdoor information. The trapdoor-generating module 15 then sends the retrieval ciphertext and the retrieval trapdoor information to the retrieval server 20.

At S16, the retrieval module 14 performs retrieval on the ciphertext stored in the database 12 according to the received retrieval trapdoor, and feeds the retrieval result back to the client 10.

At S17, the decryption module 17 of the client 10 decrypts the received retrieval result and its set, so as to obtain file identifier information.

Figure 3:
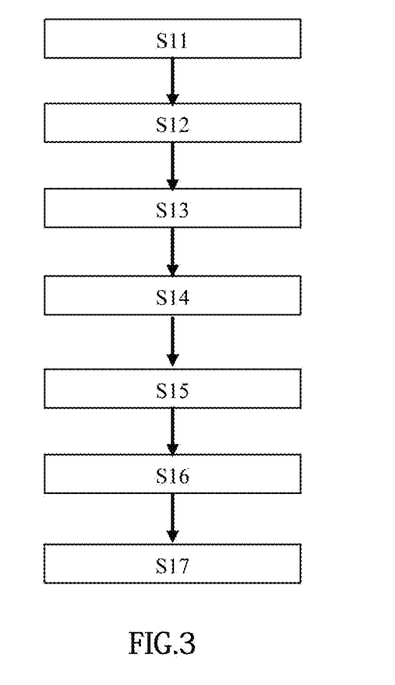
FIG. 3 is a flowchart of the method of the present invention.

As shown in FIG. 1 and FIG. 3, the disclosed method for robust, searchable, symmetrical encryption, at least comprising:

S1: during initialization, generating a searchable ciphertext and transmitting it to the retrieval server;

S2: having the retrieval server receive and store the searchable ciphertext (L, D, C);

S3: retrieving the stored ciphertext based on a retrieval trapdoor, and sending a retrieval result to the client for decryption.

Specifically, the method further comprises the following steps:

S11: initializing system parameters according to the generated key parameters and performing secret storage;

S12: sending an instruction to the retrieval server 20 for initialization of the database 12, and initializing the database 12 according to the initialization instruction; and S13: encrypting the keyword and the file identifier according to the input encryption basic information, generating a searchable ciphertext and transmitting it to the retrieval server 20.

The encryption basic information at least comprises one or more of an identifier encryption/decryption key $K_{SE}$, the main generation key S and the keyword counter log Count, the to-be-encrypted keyword w, a keyword-corresponding operation op and a keyword-associated file identifier id, the generated ciphertext index L, the generated ciphertext metadata D and the generated file identifier ciphertext C.

Generation of the searchable ciphertext is realized through:

S131: acquiring the encryption counter $Cnt_{upd}$ and the retrieval counter $Cnt_{srch}$ associated with the keyword w from the keyword counter log Count, namely ($Cnt_{upd}$, $Cnt_{srch}$)←Count[w], if ($Cnt_{upd}$, $Cnt_{srch}$)=(NULL, NULL), then setting ($Cnt_{upd}$, $Cnt_{srch}$)←(0,0);

S132: computing $Cnt_{upd}$←$Cnt_{upd}$+1;

S133: computing the retrieval key K←F(S,w||$Cnt_{srch}$) where || represents a concatenation operation for bit strings.

S134: computing the ciphertext unique identification key K'←F(S,w||IC), where IC may be any fixed constant value that can never be obtained by any retrieval counter $Cnt_{srch}$, such as −1, −2, −3, etc.;

S135: computing the ciphertext index and the ciphertext metadata L||D←H(K, $Cnt_{upd}$)⊕($0^{λ'}$||op||G(K',w||id)), where ⊕ is a bit XOR operation, $0^{λ'}$ represents an all-0-bit string having a length of λ', the operation op∈{add, del} represents the operator for the present encryption, r differentiating an addition operation from a deletion operation, with a binary length of x, wherein op has two possible values, x≥1, wherein in this step, the ciphertext index L is the first $\lambda'$ bits of the result of the XOR operation and the ciphertext metadata D is the last $\lambda+x$ bits of the result of the XOR operation;

S136: computing the file identifier ciphertext C←SE.Enc($K_{SE}$, id);

S137: updating the keyword counter log Count[w]←($Cnt_{upd}$, $Cnt_{srch}$); and S138: sending (L, D, C) as the searchable ciphertext to the retrieval server.

Preferably, during generation of the searchable ciphertext, even if the client uploads ciphertexts generated through encryption using the same keyword w, operation op and file identifier id, the records existing in the ciphertext database CDB and the cache ciphertext database GRP will not be overridden.

By using the encryption counter and the retrieval counter, the ciphertexts generated in different encryption sessions are different. Meanwhile, during generation of a ciphertext, the present invention uses a unique identification key to endow each searchable ciphertext with a unique identity. This ensures accurate deletion made to the ciphertext during retrieval. The present invention realizes robust symmetrical encryption by differentiating ciphertexts from different encryption sessions and using unique identification keys. Moreover, during generation of a ciphertext, the file identifier is encrypted, so the retrieval server cannot get file identifier information corresponding to a certain ciphertext without knowing the identifier encryption/decryption key. This ensures backward secrecy of the present invention.

In the present invention, use of the unique identification keys eliminates the need of algebraic operations during retrieval, thereby effectively improving efficiency of ciphertext retrieval. Meanwhile, in the present invention, the searchable ciphertext is generated using the counter, and this allows segment-wise computation of the value of the counter during retrieval, thereby realizing multithreading, parallel retrieval.

At S14, the database 12 receives and stores the searchable ciphertext. Therein, the searchable ciphertext is stored using L as its index. Thus, it is stored in the form of CDB[L]←(D, C).

At S15, the trapdoor-generating module 15 according to the input encryption basic information generates a retrieval ciphertext, and creates corresponding retrieval trapdoor information. The trapdoor-generating module 15 sends the retrieval ciphertext and the retrieval trapdoor information to the retrieval server 20.

Therein, according to the input keyword counter log Count, the main generation key S and the to-be-retrieved keyword w, the retrieval trapdoor information is generated.

Generation of the retrieval trapdoor information is specifically realized through the following steps:

S151: acquiring the record ($Cnt_{upd}$, $Cnt_{srch}$)←Count[w] associated with w from the keyword counter log Count, and if ($Cnt_{upd}$, $Cnt_{srch}$)=(NULL, NULL), which means that the client has never encrypted a searchable ciphertext for that keyword, ending the retrieval process;

S152: computing the retrieval key K←F(S,w∥$Cnt_{srch}$) and the ciphertext unique identification key K'←F(S,w∥IC);

S153: computing the cache ciphertext index $Loc_{grp}$←G(K',w);

S154: updating the keyword counter log Count[w]←(0, $Cnt_{srch}$+1); and

S155: sending ($Cnt_{upd}$, K, $Loc_{grp}$) as the retrieval trapdoor information to the retrieval server.

At S16, retrieval is performed on the ciphertext stored in the database 12 according to the received retrieval trapdoor and the retrieval result is fed back to the client 10.

Preferably, the retrieval server acquires the last received first ciphertext set $C_{new}$ before the present retrieval session from the ciphertext database CDB according to the retrieval key K and the encryption counter $Cnt_{upd}$ sent by the client.

Further included is acquiring the second ciphertext set $C_{cache}$ in the retrieval request history from the cache ciphertext database GRP according to the cache ciphertext index $Loc_{grp}$, and merging the first ciphertext set $C_{new}$ and the second ciphertext set $C_{cache}$ to form a retrieval set $\mathcal{J}$ that is sent to the client for decryption.

The foregoing retrieval is specifically realized through.

S161: defining an integer variable i←$Cnt_{upd}$, and initializing three empty sets $\mathcal{J}$, $\mathcal{D}$ and $\mathcal{T}$;

S162: if i=0, going to S168;

S163: computing L∥$D_{mask}$←(K, i) to obtain L and $D_{mask}$, where L is the first a $\lambda'$ bits of the operation result of the Hash function H(K, i), and $D_{mask}$ is the last $\lambda+x$ bits of the operation result of H(K, i);

S164: acquiring a ciphertext CDB[L] corresponding to the ciphertext index L from the ciphertext database CDB, so as to obtain the ciphertext metadata D and the file identifier ciphertext C, and analyzing the ciphertext according to op∥X←D⊕$D_{mask}$, so as to obtain the operator op and the information X of the ciphertext CDB[L], where the operator op has a length of x bits, and the information X has a length of $\lambda$ bits; and at last, deleting the ciphertext corresponding to the ciphertext index L from the ciphertext database CDB;

S165: if op=del, computing $\mathcal{D} \leftarrow \mathcal{D} \cup \{(X, i)\}$, storing the tuple (X, i) into the set $\mathcal{D}$, and going to S167; or otherwise, going to S166;

S166: computing $\mathcal{T} \leftarrow \mathcal{T} \cup \{(X, C, i)\}$, storing the tuple (X, C, i) into the set $\mathcal{T}$, and going to S167;

S167: computing i←i−1, and going to S162;

S168: acquiring the cache ciphertext set GRP[$Loc_{grp}$] associated with w from the cache ciphertext database GRP according to cache ciphertext index $Loc_{grp}$, wherein all the data stored in the cache ciphertext set are tuples in the form of (X', C'); deleting all the (X', C') tuples that satisfy X'∈{$X_\mathcal{D}$ | ($X_\mathcal{D}$, i)∈$\mathcal{D}$} from GRP[$Loc_{grp}$], and recording the post-deletion GRP[$Loc_{grp}$] as $C_{cache}$;

S169: among all the tuples ($X_\mathcal{T}$, $C_\mathcal{T}$, $i_\mathcal{T}$) in the $\mathcal{T}$, if there is a tuple ($X_\mathcal{D}$, $i_\mathcal{D}$)∈$\mathcal{D}$, which satisfies $X_\mathcal{T}$=$X_\mathcal{D}$, and $i_\mathcal{T}$<$i_\mathcal{D}$, deleting ($X_\mathcal{T}$, $C_\mathcal{T}$, $i_\mathcal{T}$) from $\mathcal{T}$, and recording the present $\mathcal{T}$ as $C_{new}$;

S1610: computing $\mathcal{J} \leftarrow \{C'|(X', C')\in C_{cache}\} \cup \{C_\mathcal{T} | (X_\mathcal{T}, C_\mathcal{T}, i_\mathcal{T})\in C_{new}\}$;

S1611: updating the cache ciphertext set GRP[$Loc_{grp}$] associated with w into GRP[$Loc_{grp}$]=$C_{cache} \cup \{(X_\mathcal{T}, C_\mathcal{T})|(X_\mathcal{T}, C_\mathcal{T}, i_\mathcal{T})\in C_{new}\}$; and S1612: sending $\mathcal{J}$ as the retrieval result set to the client.

During retrieval, the retrieval server can traverse searchable ciphertexts stored in the retrieval server by simply increasing or decreasing the count of the encryption counter uploaded by a user. Through processing different counter values in a parallel manner, the retrieval server can access all the searchable ciphertexts parallelly, thereby significantly improving retrieval efficiency.

According to the present invention, during ciphertext retrieval, the retrieval server can correctly handle the users' unreasonable requests for encryption retrieval, such as repeated addition/deletion requests or deletion-before-addition requests, and remain functionality as well as the designer's asserted secrecy, thereby providing robustness.

After every retrieval session, the retrieval module can obtain different retrieval keys by adding the value of the retrieval counter, thereby solving the problem that an old retrieval key cannot be used to retrieve a ciphertext newly generated, or a new ciphertext cannot be retrieved using a historical key. Therein, the present invention stores the encryption counter and the retrieval counter in advance, and then generates a key. Meanwhile, the present invention eliminates association between the ciphertexts generated from different retrieval sessions by updating the encryption counter and the retrieval counter. Thus, the present invention provides forward secrecy.

To sum up, the present invention provides forward and backward secrecy.

At S17, the decryption module 17 of the client 10 decrypts the received retrieval result and its set, so as to obtain the file identifier information.

Specifically, the decryption is realized through:

S171: if $\mathcal{J}$ is an empty set, ending the operation; and

S172: if $\mathcal{J}$ contains n elements $\{C_1, C_2, \ldots C_n\}$, executing $id_i \leftarrow SE.Dec(K_{SE}, C_i)$ for every element $C_i$, $1 \leq i \leq n$ in $\mathcal{J}$, and outputting the file identifier result set $\{id_1, id_2, \ldots id_n\}$.

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A method for robust, searchable, symmetrical encryption, the method at least comprising:
during initialization, having a retrieval server perform retrieval on stored ciphertext information according to a searchable ciphertext and retrieval trapdoor information ($Cnt_{upd}$, K, $Loc_{grp}$) sent by a client, wherein,
the retrieval server acquires a last received first ciphertext set $C_{new}$ from a ciphertext database CDB just before the present retrieval according to a retrieval key K and an encryption counter $Cnt_{upd}$ sent by the client,
acquiring a second ciphertext set $C_{cache}$ in a retrieval request history from a cache ciphertext database GRP according to a cache ciphertext index $Loc_{grp}$, and
merging the first ciphertext set $C_{new}$ and the second ciphertext set $C_{cache}$ to form a retrieval set $\mathcal{J}$, and sending it to the client for decryption.

2. The method of claim 1, wherein generation of the searchable ciphertext at least comprises:
acquiring a retrieval counter $Cnt_{srch}$ and the encryption counter $Cnt_{upd}$ related to a keyword w from a keyword counter log Count,
computing the retrieval key K and a ciphertext unique identification key K' based on the retrieval counter $Cnt_{srch}$,
computing a ciphertext index L and a ciphertext metadata D based on the encryption counter $Cnt_{upd}$, the retrieval key K, and the ciphertext unique identification key K', and sending (L, D, C) as the searchable ciphertext to the retrieval server, wherein a file identifier ciphertext $C \leftarrow SE.Enc(K_{SE}, id)$.

3. The method of claim 2, wherein computation of the retrieval key K is realized by:

$K \leftarrow F(S, w \| Cnt_{srch})$, wherein $\|$ represents a concatenation operation for bit strings, S represents a main generation key, w represents the keyword, and $Cnt_{srch}$ represents the retrieval counter.

4. The method of claim 2, wherein computation of the ciphertext unique identification key K' is realized by:

$K' \leftarrow F(S, w \| IC)$, wherein S represents a main generation key, w represents the keyword, $\|$ represents a concatenation operation for bit strings, and IC is any fixed constant value that can never be obtained by the retrieval counter $Cnt_{srch}$.

5. The method of claim 4, wherein computation of the ciphertext index L and the ciphertext metadata D is realized by:

$$L \| D \leftarrow H(K, Cnt_{upd}) \oplus (0^{\lambda'} \| op \| G(K', w \| id)),$$

wherein, K represents the retrieval key, $Cnt_{upd}$ represents the encryption counter; $\oplus$ is a bit XOR operation; $0^{\lambda'}$ represents an all 0 bit string having a length of $\lambda'$; $op \in \{add, del\}$, represents an operator of the present encryption, for differentiating an addition operation from a deletion operation, with a binary length of x, $x \geq 1$; K' represents the ciphertext unique identification key, w represents the keyword, id represents the file identifier, the ciphertext index L represents the first $\lambda'$ bits of a result of the XOR operation; the ciphertext metadata D represents the last $\lambda+x$ bits of the result of the XOR operation.

6. The method of claim 5, wherein generation of the searchable ciphertext further comprises:
after computation of the ciphertext index L, the ciphertext metadata D and the file identifier ciphertext C is done, updating the keyword counter log Count[w]←($Cnt_{upd}$, $Cnt_{srch}$), wherein $Cnt_{srch}$ srch represents the retrieval counter, and $Cnt_{upd}$ represents the encryption counter.

7. The method of claim 5, wherein
the encryption basic information comprises one or more of an identifier encryption/decryption key $K_{SE}$, the main generation key S and the keyword counter log Count, the to-be-encrypted keyword w, a keyword-corresponding operation op and a keyword-associated file identifier id, the generated ciphertext index L, the generated ciphertext metadata D, and the generated file identifier ciphertext C.

8. The method of claim 7, wherein
the retrieval server at least comprises a database and a retrieval module.

9. The method of claim 8, wherein
the key-generating module is used to perform system initialization locally and generate symmetric keys and the key-generating module is configured to initialize a database on the retrieval server.

10. A system for robust, searchable, symmetrical encryption, the system at least comprising: a client and a retrieval server, the client and the retrieval server being in wired or wireless data connection,
during initialization, the retrieval server performs retrieval on stored ciphertext information according to a searchable ciphertext and retrieval trapdoor information ($Cnt_{upd}$, K, $Loc_{grp}$) sent by the client, wherein
the retrieval server acquires a last received first ciphertext set $\mathcal{T}$ from a ciphertext database CDB just before the present retrieval according to a retrieval key K and an encryption counter $Cnt_{upd}$ sent by the client, and where there is tuple $(X_\mathcal{D}, i_\mathcal{D}) \in \mathcal{D}$, and $X_\mathcal{T} = X_\mathcal{D}$, $i_\mathcal{T} < i_\mathcal{D}$ is true, $(X_\mathcal{T}, C_\mathcal{T}, i_\mathcal{T})$ is deleted from $\mathcal{T}$, and the first ciphertext set $\mathcal{T}$ after the deletion is denoted by $C_{new}$, wherein $\mathcal{D}$ represents a set comprising at least one tuple that includes meta-information $X_\mathcal{D}$ and a counter $i_\mathcal{D}$, and acquiring a cache ciphertext set $GRP[Loc_{grp}]$ associated with the keyword w from a cache ciphertext database GRP according to a cache ciphertext index $Loc_{grp}$, deleting any (X', C')tuple that satisfies $X' \in \{ X_\mathcal{D} \mid (X_\mathcal{D}, i) \in \mathcal{D} \}$ from the cache ciphertext set $GRP[Loc_{grp}]$, and denoting the $GRP[Loc_{grp}]$ after the deletion as a second ciphertext set $C_{cache}$, and merging file identifier ciphertexts in both of the first ciphertext set $C_{new}$ and the second ciphertext set $C_{cache}$ to form the retrieval set $\mathcal{J}$ sent to the client for decryption.

11. The system of claim 10, wherein the client generates the retrieval trapdoor information by:
based on a log $(Cnt_{upd}, Cnt_{srch}) \leftarrow Count[w]$ that is associated to the keyword w and is acquired from the keyword counter log Count,
where $(Cnt_{upd}, Cnt_{srch}) \neq (NULL, NULL)$,
computing the retrieval key $K \leftarrow F(S,w\|Cnt_{srch})$, a ciphertext unique identification key $K' \leftarrow F(S,w\|IC)$ and a cache ciphertext index $Loc_{grp} \leftarrow G(K',w)$, respectively,
sending $(Cnt_{upd}, K, Loc_{grp})$ as the retrieval trapdoor information to the retrieval server, wherein, $Cnt_{srch}$ represents a retrieval counter.

12. The system of claim 10, wherein the client decrypts the retrieval set $\mathcal{J}$ by:
if $\mathcal{J}$ is an empty set, ending the operation; or
if there are n elements $\{C_1, C_2, \ldots C_n\}$ in $\mathcal{J}$, for each said element $C_i$, $1 \leq i \leq n$ in the $\mathcal{J}$, performing $id_i \leftarrow SE.Dec(K_{SE}, C_i)$, and outputting a file identifier result set $\{id_1, id_2, \ldots id_n\}$.

13. The system of claim 12, wherein the system is configured to:
acquire a retrieval counter $Cnt_{srch}$ and the encryption counter $Cnt_{upd}$ related to a keyword w from a keyword counter log Count,
compute the retrieval key K and a ciphertext unique identification key K' based on the retrieval counter $Cnt_{srch}$,
compute a ciphertext index L and a ciphertext metadata D based on the encryption counter $Cnt_{upd}$, the retrieval key K, and the ciphertext unique identification key K', and
send (L, D, C) as the searchable ciphertext to the retrieval server, wherein a file identifier ciphertext $C \leftarrow SE.Enc(K_{SE}, id)$.

14. The system of claim 13, wherein computation of the retrieval key K is realized by:
$K \leftarrow F(S,w\|Cnt_{srch})$, wherein $\|$ represents a concatenation operation for bit strings, S represents a main generation key, w represents the keyword, and $Cnt_{srch}$ represents the retrieval counter.

15. The system of claim 14, wherein computation of the ciphertext unique identification key K' is realized by:
$K' \leftarrow F(S,w\|IC)$, wherein S represents a main generation key, w represents the keyword, $\|$ represents a concatenation operation for bit strings, and IC is any fixed constant value that can never be obtained by the retrieval counter $Cnt_{srch}$.

16. The system of claim 15, wherein computation of the ciphertext index L and the ciphertext metadata D is realized by:

$$L\|D \leftarrow H(K, Cnt_{upd}) \oplus (0^{\lambda'}\|op\|G(K',w\|id)),$$

wherein, K represents the retrieval key, $Cnt_{upd}$ represents the encryption counter, $\oplus$ is a bit XOR operation; $0^{\lambda'}$ represents an all 0 bit string having a length of $\lambda'$; $op \in \{add, del\}$, represents an operator of the present encryption, for differentiating an addition operation from a deletion operation, with a binary length of x, $x \geq 1$; K' represents the ciphertext unique identification key, w represents the keyword, id represents the file identifier, the ciphertext index L represents the first $\lambda'$ bits of a result of the XOR operation; the ciphertext metadata D represents the last $\lambda + x$ bits of the result of the XOR operation.

17. The system of claim 16, wherein generation of the searchable ciphertext further comprises:
after computation of the ciphertext index L, the ciphertext metadata D and the file identifier ciphertext C is done, updating the keyword counter log $Count[w] \leftarrow (Cnt_{upd}, Cnt_{srch})$, wherein $Cnt_{srch}$ represents the retrieval counter, and $Cnt_{upd}$ represents the encryption counter.

18. The system of claim 17, wherein the encryption basic information comprises one or more of an identifier encryption/decryption key $K_{SE}$, the main generation key S and the keyword counter log Count, the to-be-encrypted keyword w, a keyword-corresponding operation op and a keyword-associated file identifier id, the generated ciphertext index L, the generated ciphertext metadata D, and the generated file identifier ciphertext C.

19. The system of claim 18, wherein the retrieval server at least comprises a database and a retrieval module.

20. The system of claim 19, wherein the key-generating module is used to perform system initialization locally and generate symmetric keys and the key-generating module is configured to initialize a database on the retrieval server.

* * * * *